US008547396B2

(12) United States Patent
Jung

(10) Patent No.: US 8,547,396 B2
(45) Date of Patent: Oct. 1, 2013

(54) SYSTEMS AND METHODS FOR GENERATING PERSONALIZED COMPUTER ANIMATION USING GAME PLAY DATA

(76) Inventor: Jaewoo Jung, Palo Alto, CA (US)

( * ) Notice: Subject to any disclaimer, the term of this patent is extended or adjusted under 35 U.S.C. 154(b) by 1161 days.

(21) Appl. No.: 12/006,350

(22) Filed: Dec. 31, 2007

(65) Prior Publication Data
US 2009/0153567 A1 Jun. 18, 2009

Related U.S. Application Data

(60) Provisional application No. 60/901,237, filed on Feb. 13, 2007.

(51) Int. Cl.
*G09G 5/00* (2006.01)
(52) U.S. Cl.
USPC ............ 345/619; 345/473; 345/643; 345/646
(58) Field of Classification Search
USPC ............... 715/769; 704/229; 463/42, 41, 463/23; 345/427
See application file for complete search history.

(56) References Cited

U.S. PATENT DOCUMENTS

| 5,779,548 | A | 7/1998 | Asai et al. | |
|---|---|---|---|---|
| 6,072,504 | A | * | 6/2000 | Segen ........................... 345/474 |
| 6,167,562 | A | | 12/2000 | Kaneko |
| 6,336,865 | B1 | * | 1/2002 | Kinjo .............................. 463/34 |
| 6,433,784 | B1 | | 8/2002 | Merrick et al. |
| 6,476,830 | B1 | * | 11/2002 | Farmer et al. ................. 715/769 |
| 6,607,445 | B1 | | 8/2003 | Gendo et al. |
| 6,863,608 | B1 | | 3/2005 | LeMay et al. |
| 2004/0012641 | A1 | | 1/2004 | Gauthier |
| 2006/0074649 | A1 | * | 4/2006 | Pachet et al. ................... 704/229 |
| 2006/0087508 | A1 | * | 4/2006 | Drexler et al. ................. 345/427 |
| 2006/0205510 | A1 | * | 9/2006 | Lauper et al. .................... 463/41 |
| 2006/0281535 | A1 | * | 12/2006 | Bogan ............................. 463/23 |
| 2007/0011617 | A1 | | 1/2007 | Akagawa et al. |
| 2007/0046666 | A1 | * | 3/2007 | Kokojima et al. ............ 345/427 |
| 2007/0162854 | A1 | | 7/2007 | Kikinis |
| 2007/0298886 | A1 | * | 12/2007 | Aguilar et al. ................... 463/42 |
| 2008/0132331 | A1 | * | 6/2008 | Gatto et al. ..................... 463/31 |

FOREIGN PATENT DOCUMENTS

| KR | 10-2003-0090577 | 11/2003 |
|---|---|---|
| KR | 1020030090577 | 11/2003 |
| KR | 2005-0040532 | 5/2005 |
| KR | 1020050040532 | 5/2005 |
| WO | WO 2006/008573 | 1/2006 |

OTHER PUBLICATIONS

Mark Henne, Hal Hickel, Ewan Johnson, and Sonoko Konishi, "The making of Toy Stroy," Proceedings of the COMPCON Spring '96,—41st IEEE Internaltional Computer Conference.
John Godwin and Stephen Payne, "A Tale of Rock: Production Diary," www.idlecreations.com/taleofrock, 2007.

* cited by examiner

*Primary Examiner* — Phi Hoang
(74) *Attorney, Agent, or Firm* — Patent Office of Dr. Chung Park

(57) ABSTRACT

Systems, methods, and computer storage media for generating a computer animation of a game. A custom animation platform receives game play data of the game and determines at least one scene based on the game play data. Then, one or more frames in the scene are set up, where at least one of the frames includes at least one non-game pre-production element of the game. Subsequently, the frames are rendered and the rendered frames are combined to generate a computer animation.

20 Claims, 9 Drawing Sheets

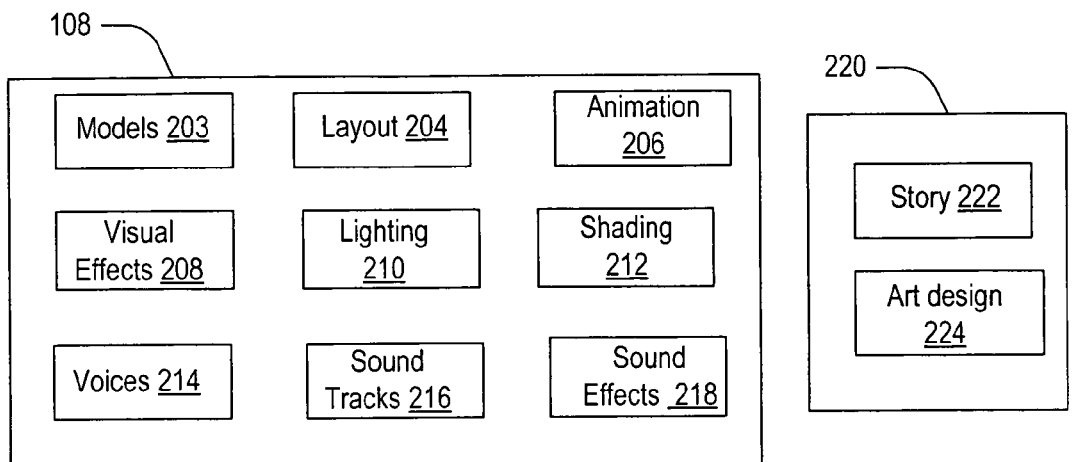
FIG. 2A
FIG. 2B
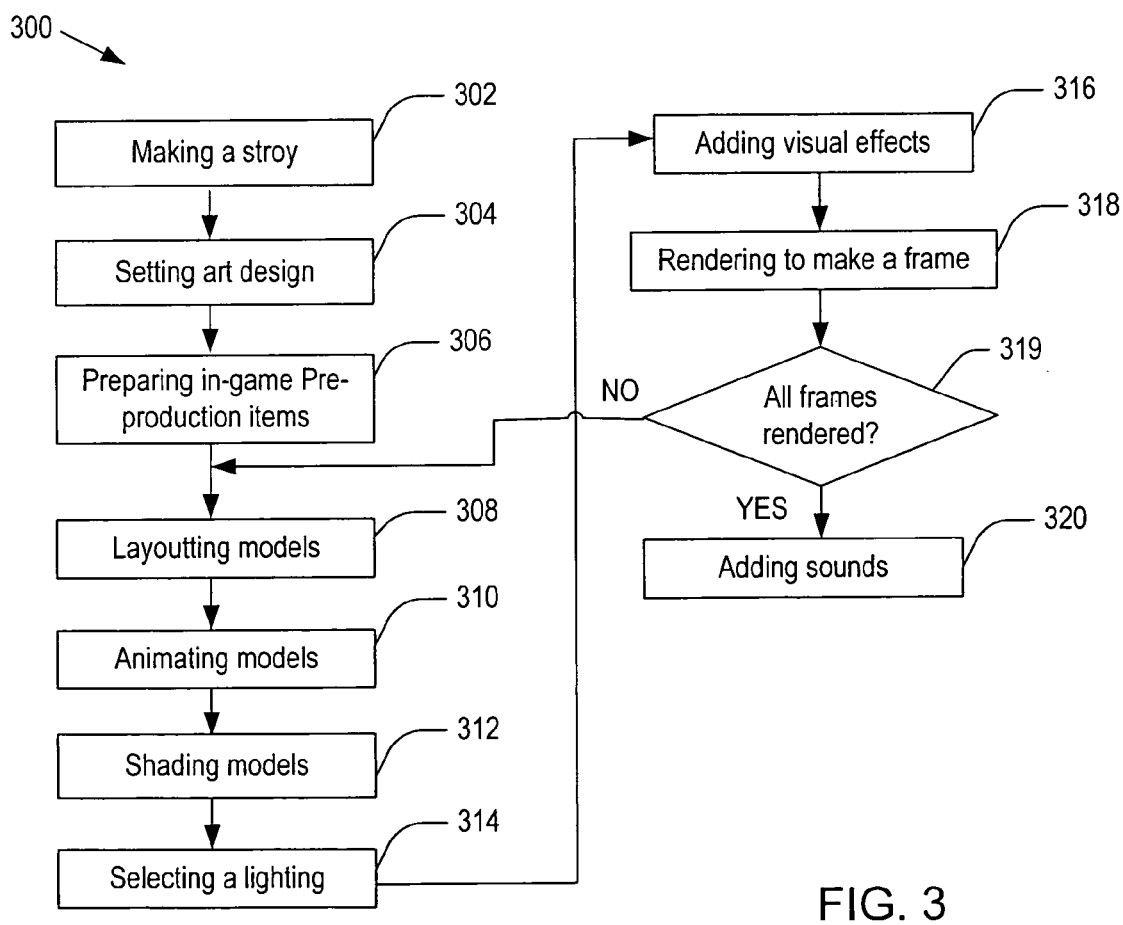
FIG. 3

802

| UTC | PLAYER SELECTION | GAME REACTION | LOCATION |
| --- | --- | --- | --- |
| Jul 1, 2007 12:30:01 | Game Started | Record Start Time | In front of the monster's layer |
| Jul 1, 2007 12:30:05 | Player hides on top of a temple, above a monster | A monster is not aware of the player character | In front of the monster's layer |
| Jul 1, 2007 12:31:08 | Player jumps from the temple, attacking the monster | The monster is surprised, trying to face the attacker | In front of the monster's layer |
| Jul 1, 2007 12:32:15 | Player cuts right horn of the monster with a sword | The monster cries in pain | Next to the temple |
| Jul 1, 2007 12:33:02 | Player continues attacking | The monster battles the attacker | Next to the temple |
| Jul 1, 2007 12:38:55 | Player kills the monster | The monster dies | Near a treasure chest |
| Jul 1, 2007 12:39:56 | Player picks up a cloak of invisibility, finishes the game | Record completion time | Near a treasure chest |

804

| UTC | PLAYER SELECTION | GAME REACTION | LOCATION |
| --- | --- | --- | --- |
| Jul 1, 2007 14:10:21 | Game Started | Record Start Time | In front of the monster's layer |
| Jul 1, 2007 14:11:05 | Player hides on top of a temple, above a monster | A monster is not aware of the player character | In front of the monster's layer |
| Jul 1, 2007 14:12:28 | Player attacks the monster with a bow and arrows | The monster is surprised, trying to face the attacker | In front of the monster's layer |
| Jul 1, 2007 14:14:15 | Player continues attacking monster with a bow and arrows | The monster tries to climb the platform | In front of the monster's layer |
| Jul 1, 2007 14:17:55 | Player kills the monster | The monster falls down to the ground to death | Near a treasure chest |
| Jul 1, 2007 14:18:56 | Player picks up a cloak of invisibility, finishes the game | Record completion time | Near a treasure chest |

SYSTEMS AND METHODS FOR GENERATING PERSONALIZED COMPUTER ANIMATION USING GAME PLAY DATA

CROSS REFERENCE TO RELATED APPLICATIONS

This application claims the benefit of U.S. Provisional Applications No. 60/901,237, entitled "Method for generating personal contents based on game player action and managing the same," filed on Feb. 13, 2007.

BACKGROUND OF THE DISCLOSURE

The present invention generally relates to computer animation and, more particularly, to systems and methods for generating computer animations using game play data.

Advancements in computer hardware and software technologies in recent decades have made development and production of computer animations easier and faster each year. For an example, the first feature film produced entirely using a computer animation technology took a major animation studio several years of effort in early 1990's. (Mark Henne, Hal Hickel, Ewan Johnson, and Sonoko Konishi, "The Making of Toy Story," COMPCON Spring 1996—41st IEEE International Computer Conference Proceedings, pages 463-468, 1996). In comparison, a computer animation film was produced by two students within seven months in 2006 as a thesis project (John Godwin and Stephen Payne, "A Tale of Rock: Production Diary," www.idlecreations.com/taleofrock/, 2007).

Such advancements have been possible partly due to many attempts to provide easy to use tools for creating computer animations. However, one needs to learn to use the existing tools used in each production step of the computer animations. Typically, it takes at least two years in college or equivalent education to learn technological aspects of creating computer animations. Therefore, even with the advancements, required proficiency in technology and artistic talent to create computer animations can make the animation development process quite challenging to non-professionals in the computer animation field.

SUMMARY OF THE DISCLOSURE

In one aspect of the present invention, a method for generating a computer animation of a game includes the steps of: receiving game play data of the game; determining at least one scene based on the game play data; setting up one or more frames in the scene, at least one of the frames including at least one non-game pre-production element of the game; rendering the frames; and combining the rendered frames to generate the computer animation.

In another aspect of the present invention, a computer system for generating a computer animation of a game includes: means for receiving game play data of the game; means for determining at least one scene based on the game play data; means for setting up one or more frames in the scene, at least one of the frames including at least one non-game pre-production element of the game; means for rendering the frames; and means for combining the rendered frames to generate the computer animation.

In yet another aspect of the present invention, there are provided computer readable media carrying one or more sequences of pattern data for generating a computer animation of a game, wherein execution of one or more sequences of pattern data by one or more processors causes the one or more processors to perform the steps of: receiving game play data of the game; determining at least one scene based on the game play data; setting up one or more frames in the scene, at least one of the frames including at least one non-game pre-production element of the game; rendering the frames; and combining the rendered frames to generate the computer animation.

BRIEF DESCRIPTION OF THE DRAWINGS

FIG. 2A shows in-game pre-production items that might be included in a custom animation platform of FIG. 1;

FIG. 2B shows creative development items that might be created in a creative development process;

FIG. 3 shows a flow chart illustrating exemplary steps that might be carried out to generate the items of FIGS. 2A-2B and a computer game animation using the same items;

FIG. 8 shows two exemplary game play data recorded during two different plays of the computer game of FIG. 7;

DETAILED DESCRIPTION OF THE PREFERRED EMBODIMENTS

The following detailed description is of the best currently contemplated modes of carrying out the invention. The description is not to be taken in a limiting sense, but is presented merely for the purpose of illustrating the general principles of the invention, since the scope of the invention is best defined by the appended claims.

Figure 1:
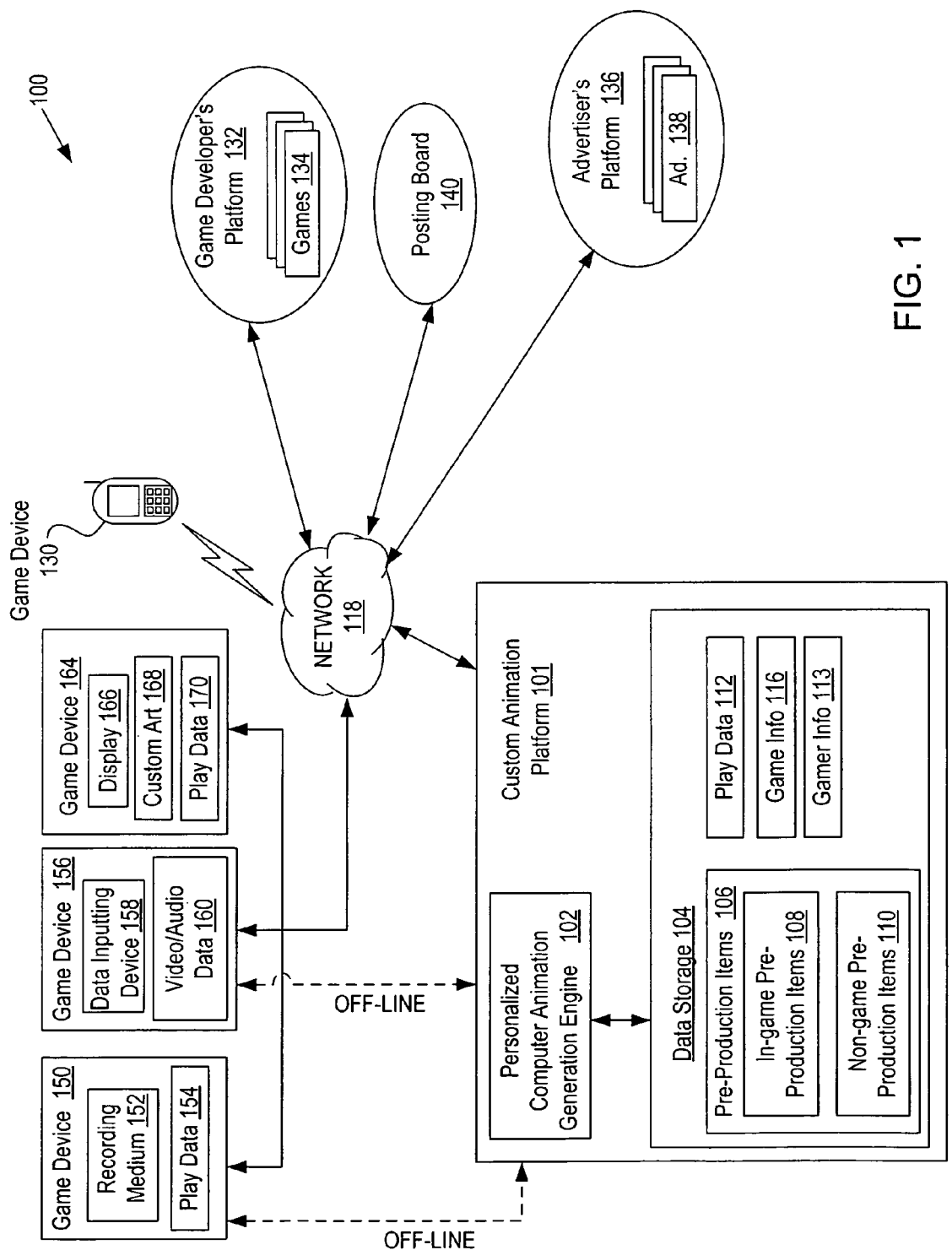
FIG. 1 shows a system environment in accordance with an embodiment of the present invention.

Referring now to FIG. 1, there is shown at 100 a schematic diagram of a system environment in accordance with one embodiment of the present invention. As depicted, the system 100 may include a custom animation platform 101; game devices 130, 150, 156, and 164; a game developer's platform 132; a posting board 140; and an advertiser's platform 136, which may be connected to a network 118. The network 118 may include any suitable connections for communicating electrical signals therethrough, such as WAN, LAN, or the Internet.

The custom animation platform 101 includes a personalized computer animation generation engine 102 (or, shortly, animation engine, hereinafter); and data storage 104 coupled to the animation engine 102 and storing pre-production items 106, game play data (or, shortly, play data hereinafter) 112, game information 116, and gamer information 113. The custom animation platform 101 may be a computer or any other suitable electronic device for running the animation engine 102 therein. For the purpose of illustration, the data storage 104 is shown to be included in the custom animation platform 101. However, it should be apparent to those of ordinary skill that the data storage 104 may be physically located outside the custom animation platform and coupled to the animation engine 102 directly or via the network 118.

The game device 164 includes: a display 166 for displaying visual images to a user of the device (or, game player, hereinafter); a storage or memory for storing custom art 168; and a storage or memory for storing game play data 170. The game device 164 may be a PC, for instance, and include peripheral devices (not shown in FIG. 1), such as joystick or keyboard, that allows the user to interact with the game device.

The custom arts 168 may include art works generated by the game player who generates the play data 170 and/or by third parties, such as computer animation freelancers, students, studios, amateur enthusiasts, etc. By way of example, the custom art 168 may include a digital portrait of the game player, which is not seen during play of a computer game nor through replay of game scenes generated by use of in-game pre-production items only. (In-game pre-production items will be described in detail below with reference to FIG. 2A.) The custom art 168 may be sent to and stored in the data storage 104 such that the custom art may be incorporated into personalized computer animations generated by the animation engine 102. The term personalized animation refers to a computer animation that is generated by use of game play data and includes a replay of the entire or a portion(s) of the game. For instance, a personalized animation of a football game may include touch down scenes.

The play data 170 includes records of selections made and actions taken by a game player during game play. The records may also include the time when the player starts to play the game and when certain objectives of the game are completed by the player. For accuracy and verification purposes, recorded times may be in standard time reference, such as Coordinated Universal Time (UTC) available through Network Time Protocol (NTP). The records may further include, but are not limited to, expressions generated by the player, such as dialog input. As a game player plays a game on the device 164, the device 164 may store the game play data 170 in the device 164 or concurrently send the play data to the storage 112 for play data via the network 118.

The game device 156 includes data inputting device 158 and a storage 160 for video/audio contents. The data inputting device 158 may include a scanner that can convert a printed image into a digital image, for instance. The data inputting device 158 may also receive video and/or audio data from a third body via the network 118 and subsequently store the data into the storage 160 or send the data to the custom animation platform 101 via the network 118, or both. As in the case of custom art 168, the video/audio data can be incorporated into personalized computer animations generated by the animation engine 102. It is noted that the game player may send the video/audio contents by off-line measures to the custom animation platform 101.

The game device 150 includes recording medium 152 and a storage 154 for game play data. By way of example, one or more game players may play a board game, such as Dungeons and Dragons roleplaying game, using a dice and record the game play data for each player in a suitable recording medium 152, such as PC or PDA. A dungeon master, who prepares each game session with a thorough knowledge of the game rules, presides over each game session, and serves as both storyteller and referee, may record the game play data. Then, the game player may send the recorded game play data to the custom animation platform 101 via the network 118. Alternatively, the game player may record the game play data on a paper and send the play data to the custom animation platform 101 by use of suitable off-line measures, such as ground mail.

The game device 130 may be a wireless communication device, such as cell phone or PDA, that allows a game player to play a computer game and records/sends the game play data to the custom animation platform 101 via the network 118. For brevity, only four game devices 130, 150, 156, and 164 are shown in FIG. 1. However, it should be apparent to those of ordinary skill that any suitable number of game devices may be used in the system environment 100 and more than one player may play a game simultaneously. Also, other types of game device that have features of one or more of the devices 130, 150, 156, and 164 can be used to play a game and send game play data to the custom animation platform 101.

The game developer's platform 132, which is connected to the network 118, may be used to provide the game devices 130, 150, 156, and 164 with games 134. The game developer's platform 132 may be a computer, or other suitable device that can provide tools to develop computer games for the game developers. Alternatively, the games 134 may be stored on a suitable computer storage medium, such as CD, and sold to a game player. The game developer may generate all or part of the pre-production items of a game, such as images and sounds viewed and heard during game play, in a game development process and also send game information including the pre-production items to the custom animation platform 101, more specifically to the game information storage 116, via the network 118. The in-game pre-production items are described in detail with reference to FIG. 2A.

The posting board 140, which is connected to the network 118, may be included in a web server for displaying various contents, such as personalized computer animations generated by the animation engine 102. The posting board 140 may include World Wide Web portals, World Wide Web Logs (blogs), Internet sites, Intranet portals, and Bulletin Board Systems, for instance. A personalized computer animation of a game can be generated in real-time based on game play data from a game device while the game is played on the game device. The generated animation may be sent from the custom animation platform 101 to the posting board 140 in a suitable data stream format, allowing viewers of the board to watch the live animation based on the game play on the posting board 140. The viewers can also watch the live animation on networked devices connected to the board 140.

The advertiser's platform 136, which is connected to the network 118, includes a storage 138 for advertisement contents and sends the advertisement contents to the custom animation platform 101 via the network 118. As will be discussed below, the advertisement contents 138 may be incorporated into the personalized computer animations generated by the animation engine 102. Advertisement providers can be any person, corporate, company or partnership that provides advertisements for delivery to viewers of the personalized computer animations.

As discussed above, the data storage 104 includes game play data 112 received from the game devices 130, 150, 156, and 164 via the network 118 or other suitable off-line measures. The data storage 104 also includes gamer information 113 related to game players, such as player's ID, password, age, preference, or the like. The custom animation platform 101 may gather the gamer information by asking the gamers to pre-register or analyzing the game play data to understand each gamer's preferences. The gamer information 113 may be used, for instance, to determine the types of advertisement contents incorporated into personalized animations.

The pre-production items 106 may refer to, but are not limited to, all or part of elements that are used in computer animation development and production processes and are prepared prior to the production of actual animations. The pre-production items include in-game pre-production items 108 and non-game pre-production items 110. The in-game pre-production items 108 of a computer game refer to pre-production items, such as images and sounds, that are used to produce the computer game and can be seen and heard during game plays of the computer game. FIG. 2A shows in-game pre-production items of a computer game that might be included in the custom animation platform 101. As depicted, the in-game pre-production items 108 may include, but are not limited to, models 203, layout 204, animation 206, visual effects 208, lighting 210, shading 212, voices 214, sound tracks 216, and sound effects 218.

The models 203 of a computer game includes characters (or, avatars), stages for scenes, tools used by the characters, backgrounds, trifling articles, a world in which the characters live, or any other elements used for the visual presentation in the game. The layout 204 includes information related to the arrangements of the models 203 in the game scenes. The animation 206 refers to successive movements of each model appearing in a sequence of frames. By way of comparison, the stop-motion animation technique may be used to create an animation by physically manipulating real-world objects and photographing them one frame of film at a time to create the illusion of movement of a typical clay model. In one embodiment of the present invention, several different types of stop-motion animation technique, such as graphic animation, may be applied to create the animation 206 of each model. By the animation 206, characters are brought to life with movements.

The visual effects 208 refer to visual components integrated with computer generated scenes in order to create more realistic perceptions and intended special effects. Lighting 210 refers to the placement of lights in a scene to create mood and ambience. Shading 212 is used to describe the appearance of each model, such as how light interacts with the surface of the model at a given point and/or how the material properties of the surface of the model vary across the surface. Shading can affect the appearance of the models, resulting in intended visual perceptions. The voices 214 includes voices of the characters in the game. The sound tracks (or, just tracks) 216 refers to audio recordings created or used in the game. The sound effects 218 are artificially created or enhanced sounds, or sound processes used to emphasize artistic or other contents of the animation. Hereinafter, the term sound collectively refers to the voices 214, sound tracks 216, and sound effects 218. Also, the terms sound and audio content are used interchangeably hereinafter.

It is noted that, in FIG. 2A, the in-game pre-production items 108 are shown to have nine types of items for the purpose of illustration. However, it should be apparent to those of ordinary skill that FIG. 2A does not show an exhaustive list of in-game pre-production items, nor does it imply that the entire in-game pre-production items can be grouped into nine types. For instance, the in-game pre-production items 108 may also include rendering parameters (not shown in FIG. 2A).

As will be further discussed below in conjunction with FIG. 3, the in-game pre-production items 108 may be used to generate images and sounds in the computer game animation. The in-game pre-production items 108 may be also used to make one or more distinct replays of animated scenes representing different plays of the same game. (Hereinafter, the term replay refers to replaying of animated scenes that represent a game play, where the animated scenes are generated by use of in-game pre-production items only.) Therefore, the in-game pre-production items 108 may need to be prepared to represent all or part of possible choices a player can make during game plays. For instance, all or part of the models 203 which can be selected by the player during game plays, and the items' appearances through particular shadings may be prepared and stored as in-game pre-production items 108. The in-game pre-production items may be obtained from the game information 116 sent by the game developer's platform 132. Alternatively, the in-game pre-production items may be created by a third party.

FIG. 2B shows creative development items 220 of a computer game that might be created in a creative development process. The creative development items 220 includes story 222 and art design 224. To create a game, the story 222 of the game is generated. Then, based on the story, scenarios for a computer game animation are prepared. Also, a storyboard including a cartoon-like sequence of events for each scenario is created. Art design 224 refers to selection of styles of arts throughout the game. Look and feel of the game is developed in the art design 224. The story 222 and the art design 224 for the game guide the preparation of in-game pre-production items 108.

FIG. 3 shows a flow chart 300 illustrating exemplary steps that might be carried out to generate the items 108, 220 and to produce images and sounds in a computer game animation using these items. The process begins in a state 302 to create the story 222. Then, art design 224 for the computer animation is set in a state 304. The states 302 and 304 are collectively referred to as a creative development process. Subsequently, based on the story 222 and the art design 224, the in-game pre-production items 108 are prepared in a state 306.

To produce a computer game animation, the process may proceed to a state 308. To create a frame, the models 203 are arranged according to the layout 204 in the state 308. Subsequently, in states 310 and 312, animation 206 and shading 212 are applied to the models in the frame. The art design 224 may be used to guide the steps 308 and 312. Then, the lighting 210 is selected for the frame in a state 314, and visual effects 208 are added to the frame in a state 316. Next, the frame is rendered in a state 318. Hereinafter, the term rendering refers to taking a snap shot of a frame. In a decision block 319, a determination is made as to whether all frames of the computer game animation have been rendered. If the answer to the decision block 319 is negative, the process proceeds to the state 308 and repeats to the states 316 to prepare and render another frame. Otherwise, the process proceeds to a state 320 to add sounds, such as voices 214, sound tracks 216, and sound effects 218.

As discussed above, the in-game pre-production items 108 may be used to make one or more distinct replays of animated scenes representing different plays of the same game. For instance, a game player may play a game, resulting in a game play data. Based on the game play data, an animated scene can be generated by repeatedly performing the steps 308-320. The animated scene may be displayed to the game player.

It will be appreciated by those of the ordinary skill that the illustrated process in FIG. 3 may be modified in a variety of ways without departing from the spirit and scope of the present invention. For example, various portions of the illustrated process may be combined, be rearranged in an alternate sequence, be removed, and the like. In addition, it should be noted that the process may be performed in a variety of ways, such as by software executing in a general-purpose computer, by firmware and/or computer readable medium executed by a microprocessor, by dedicated hardware, and the like. For another example, the art design 224 may be modified upon completion of the states 306-318. Then, in accordance with the modification, all or parts of the steps 306-318 may be repeated.

Figure 4:
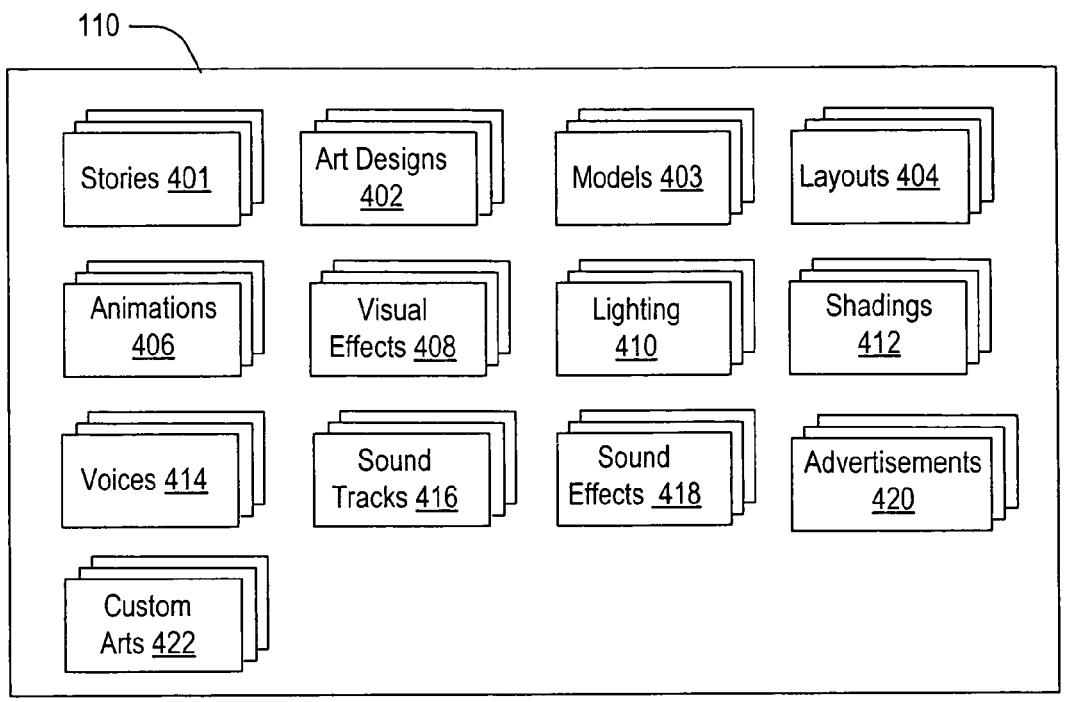
FIG. 4 shows non-game pre-production items that might be included in the custom animation platform of FIG. 1.

As depicted in FIG. 1, the pre-production items 106 includes non-game pre-production items 110. The non-game pre-production items 110 refer to pre-production items that produce images and sounds which cannot be seen or heard during game plays nor through replay of scenes generated using the in-game pre-production items 108 only. FIG. 4 shows non-game pre-production items 110 that might be included in the custom animation platform 101.

For brevity, each non-game pre-production item is not described in detail. The non-game pre-production items 110 are similar to the in-game pre-production items 108 with several differences. First, the non-game pre-production items 110 include one or more stories 401 and art designs 402 created during the creative development processes. Each story and art design correspond to a possible choice a game player can make during a game play. For instance, one game player can choose a game character to find treasures in one sequence during a quest, while another game player can choose another sequence. The creative development process may be performed to make a story and an art design for each sequence differently. Second, the advertisement contents 138 received from the advertiser's platform 136 may be used as non-game pre-production items.

Third, the custom arts 422 received from the game device 164 or from a third body may be used as non-game pre-production items. For instance, the custom art 422 may include images, such as the image of the gamer, and voice of the gamer, that cannot be seen or heard during game plays or replays. The data inputting device 158 may be used to create custom art. Fourth, models 403 have images different from those shown in game plays and replays in form, shape, or color. For instance, a game character's costume or images of backgrounds included in the models 403 are different from their counterparts 203 (shown in FIG. 2) of the in-game pre-production items 108. For another instance, the images of the models 403 can be shown in 3-dimension while the images of the models 203 are shown in 2-dimension, or vise versa. For yet another instance, the images of the models 203 can be constructed in 3-dimension with a low number of polygons while the images of the models 403 can be constructed in 3-dimension with a high number of polygons so that the images of non-game pre-production models may have enhanced visual resolutions.

Fifth, non-game pre-production items includes images or sounds additional to what are included in the counterpart in-game pre-production items. For instance, images for various facial expressions of each character can be included in the non-game pre-production items 110. For another instance, additional sound effects, such as environmental sound of bird singing, and dialogues can be included in the sound effects 418 and voices 414, respectively. Also, voices and sound effects different from what are included in the in-game pre-production items 108 in duration, periodicity, pitch, amplitude or harmonic profile can be included in the voices 414 and sound effects 418. For yet another instance, sounds from text-to-speech may be included. For still another instance, the visual effects 408 may include additional special effects, such as realistic animation of fluid flow, that cannot be displayed during the game plays or replays. For a further instance, images and sounds of game play hints and secrets of the game played and of other games can be included in the non-game pre-production items 110. For another further instance, a preview of other game may be also included in the non-game pre-production items 110. These additional images or sounds can be created from the very beginning or by modifying the in-game pre-production items 108 or importing similar images or sounds from other games and animations.

It is noted that, in FIG. 4, the non-game pre-production items 110 are shown to have thirteen types of items for the purpose of illustration. However, it should be apparent to those of ordinary skill that FIG. 4 does not show an exhaustive list of non-game pre-production items, nor does it imply that the entire non-game pre-production items can be grouped into thirteen types.

Figure 5:
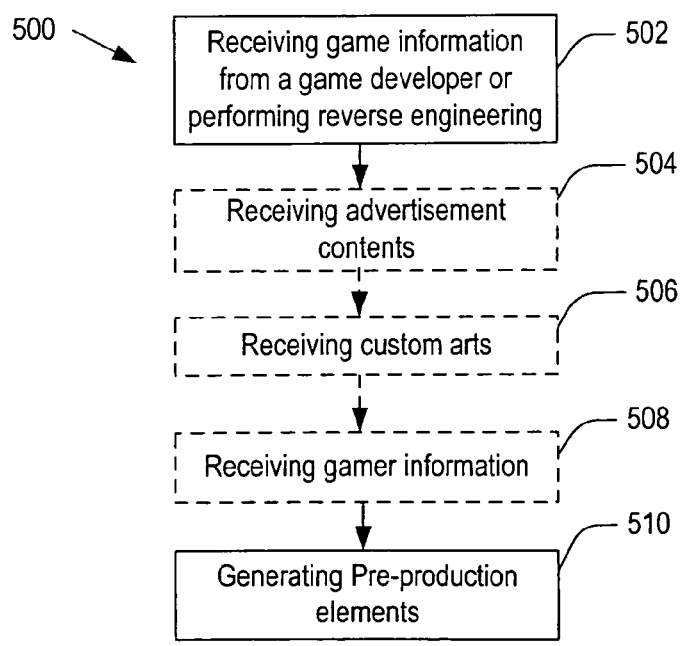
FIG. 5 shows a flow chart illustrating exemplary steps that may be carried out to generate the non-game pre-production items of FIG. 4.

FIG. 5 shows a flow chart 500 illustrating exemplary steps that may be carried out to generate the non-game pre-production items 110 of a computer game. The process starts in a state 502. In the state 502, the game information 116 may be received from the game developer's platform 132, where the game information includes, but is not limited to, scenarios of the game and in-game pre-production items developed by the game developer. As an alternative, the game information can be reverse engineered based on the game instructions or previews in the public domain.

Optionally, in states 504 and 506, the advertisement contents 138 and custom art 168 can be received from the advertiser's platform 136 and the game device 164 and stored in the non-game pre-production item storage 110 as advertisement 420 and custom arts 422, respectively. The gamer information 116, such as age, gender, preference, income, or the like, may be received from a game player in an optional state 508. Various approaches may be used to obtain game player information. For instance, a questionnaire to be filled out by the game player may be sent to the game player. For another instance, the game player may be asked to provide pre-registration information. Based on the information collected in the states 502-508, the non-game pre-production items are generated and stored in the storage 110 (FIG. 4) in a state 510.

Figure 6:
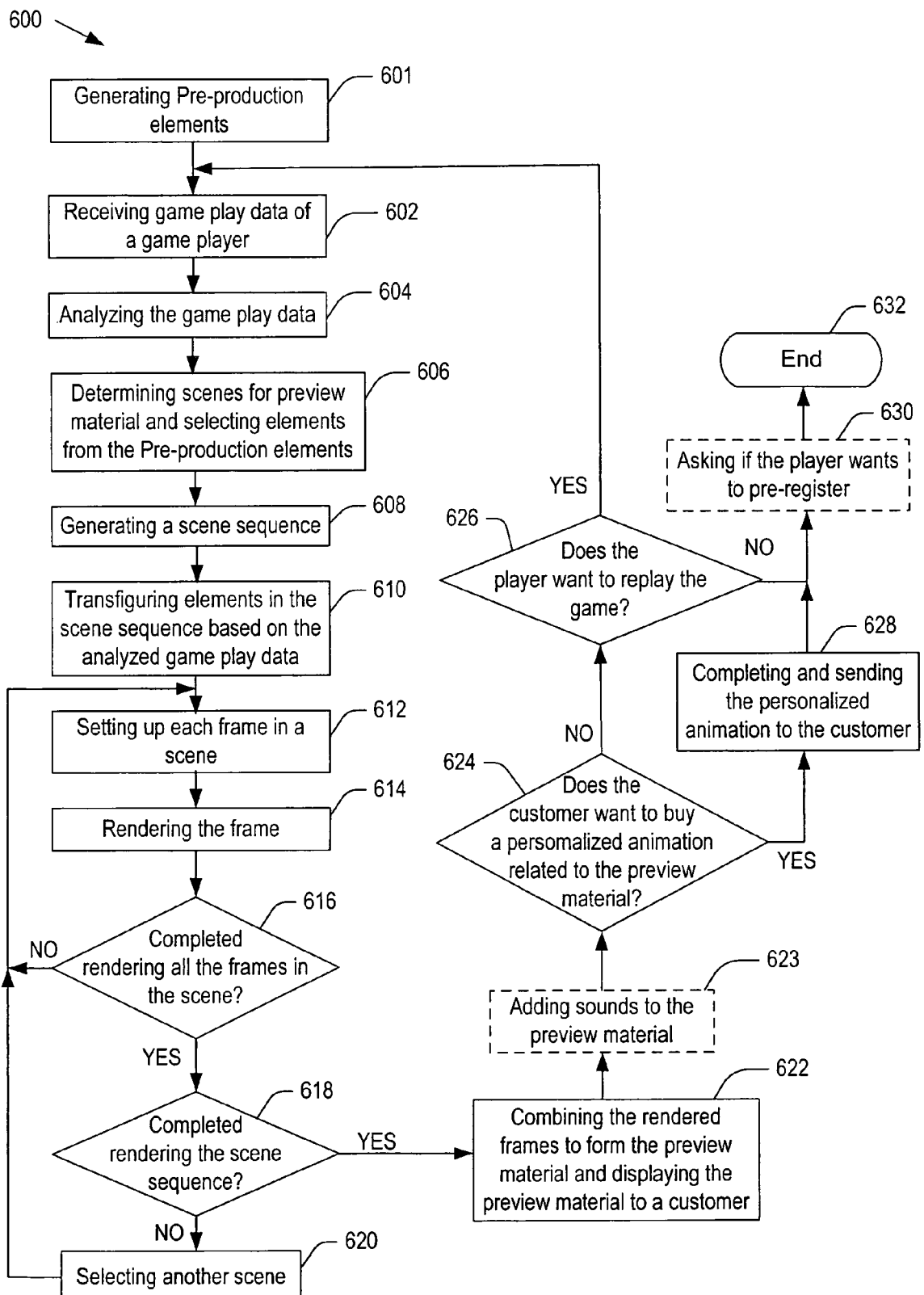
FIG. 6 shows a flow chart illustrating exemplary steps that may be carried out by a personalized animation generation engine of FIG. 1 to generate a personalized computer animation.

FIG. 6 a flow chart 600 illustrating exemplary steps that may be carried out by the animation engine 102 (shown in FIG. 1) to generate a personalized computer animation. The process starts in a state 601. In the state 601, pre-production items may be generated by the processes described in FIGS. 3 and 5 and stored in the pre-production items storage 106. Then, in a state 602, the game play data 170 may be received from one or more of the game devices 130, 150, 156, and 164 and optionally stored in the play data storage 112. Subsequently, the game play data is analyzed in a state 604. For example, a game may include a cartoon character carrying several weapons during a quest. A statistical analysis may be done to the record of weapon selections made by the game player. For another example, grading of the game play may be done as a part of the analysis based on the time taken to complete the game, giving a higher grade to a shorter completion time. Then, the process proceeds to a state 606.

In the state 606, based on the game play data, scenes to be included in preview material are determined and elements to make the scenes are selected from the pre-production items 106. The preview material may include discrete frames for the scenes, short animations of the scenes, or full personalized animations of the scenes. It is noted that the selected elements may include both the in-game and non-game pre-production items. Then, based on the game play data, a sequence of the scenes is generated in a state 608. Then, the process proceeds to a state 610.

In the state 610, the elements in the scene sequence may be transfigured based on the analyzed game play data. For instance, the analysis may indicate that the game player chose a sword more frequently than other weapons in battles. In such a case, the image of the sword may be transfigured to show higher wear and tear than other weapons. Subsequently, each frame is set up in a state 612 and rendered in a state 614. It is noted that the process may use a rendering algorithm that is not programmed into the game.

It is noted that the non-game pre-production items 110 (shown in FIG. 4) can be incorporated into the frame. For instance, an advertisement content 420 may be included in the frame. For another instance, a digital portrait of the game player stored in the custom art 422 may be included in the frame such that the portrait appears as the face image of the cartoon character. For yet another instance, a sword slightly different from the sword shown in the game play may be used in the frame. For still another instance, facial expressions of the cartoon characters and dialogues different from those in the game play may be used in the frame.

A determination is made as to whether rendering a scene has been completed in a state 616, where rendering a scene refers to taking images of all the frames in the scene. Depending on the type of the preview material, few frames may be rendered in each scene or a sequence of frames may be rendered to create an animation of each scene. Upon negative answer to the decision diamond 616, the process proceeds to the state 612. Otherwise, the process proceeds to a state 618.

In the state 618, a determination is made as to whether rendering all of the scenes in the scene sequence has been completed. Upon negative answer to the decision diamond 618, the process proceeds to a state 620 to select another scene. Subsequently, the process proceeds to the state 612. If the answer to the decision diamond 618 is positive, the process proceeds to a state 622. In the state 622, the rendered frames are combined to form the preview material and preview material is displayed to a customer. As an option, sound may be added to the preview material in a state 623, where the sound includes one or more of the voices 414, sound tracks 416, and sound effects 418. Then, the customer decides whether to buy a personalized animation related to the preview material in a state 624. The personalize animation may include a computer animation of the entire scene sequence generated in the state 608. Upon negative answer to the decision diamond 624, the process proceeds to a state 626. In a state 626, a determination is made as to whether the player wants to replay the game. Upon affirmative answer to the decision diamond 626, the process proceeds to the state 602 so that the game player can replay the game. If the answer to the decision diamond 626 is negative the process may proceed to an optional state 630.

If the customer wants to buy a personalized animation in the state 624, the process proceeds to a state 628. In the state 628, the personalized animation is completed and sent to the customer. If the personalized animation includes animations of the entire scenes while the preview material includes only discrete frames or animations of selected scenes of the scene sequence, the states 606-610 and 612-620 may be repeated to make a complete animation such that the entire scene sequence is animated. Next, the process may proceed to the optional state 630. In the state 630, the game player is asked if he wants to pre-register. The pre-registration information is stored in the gamer information 113 (shown in FIG. 1). Then, the process ends in a state 632. It is noted that the personalized computer animation can be generated in real time.

When more than one game player concurrently plays the same game on a game device or game devices connected to each other via the network 118, the personalized computer animation that contains all or part of the players with perspectives from non-player objects, and from each player, are generated. For example, a touch down scene of a computer football game may be included in multiple personalized computer animations. In one animation, the scene may be generated with the perspective from the defense. In another animation, the scene may be generated with the perspective from the offence. In yet another animation, the scene may be generated with the perspective from a spectator.

Figure 7:
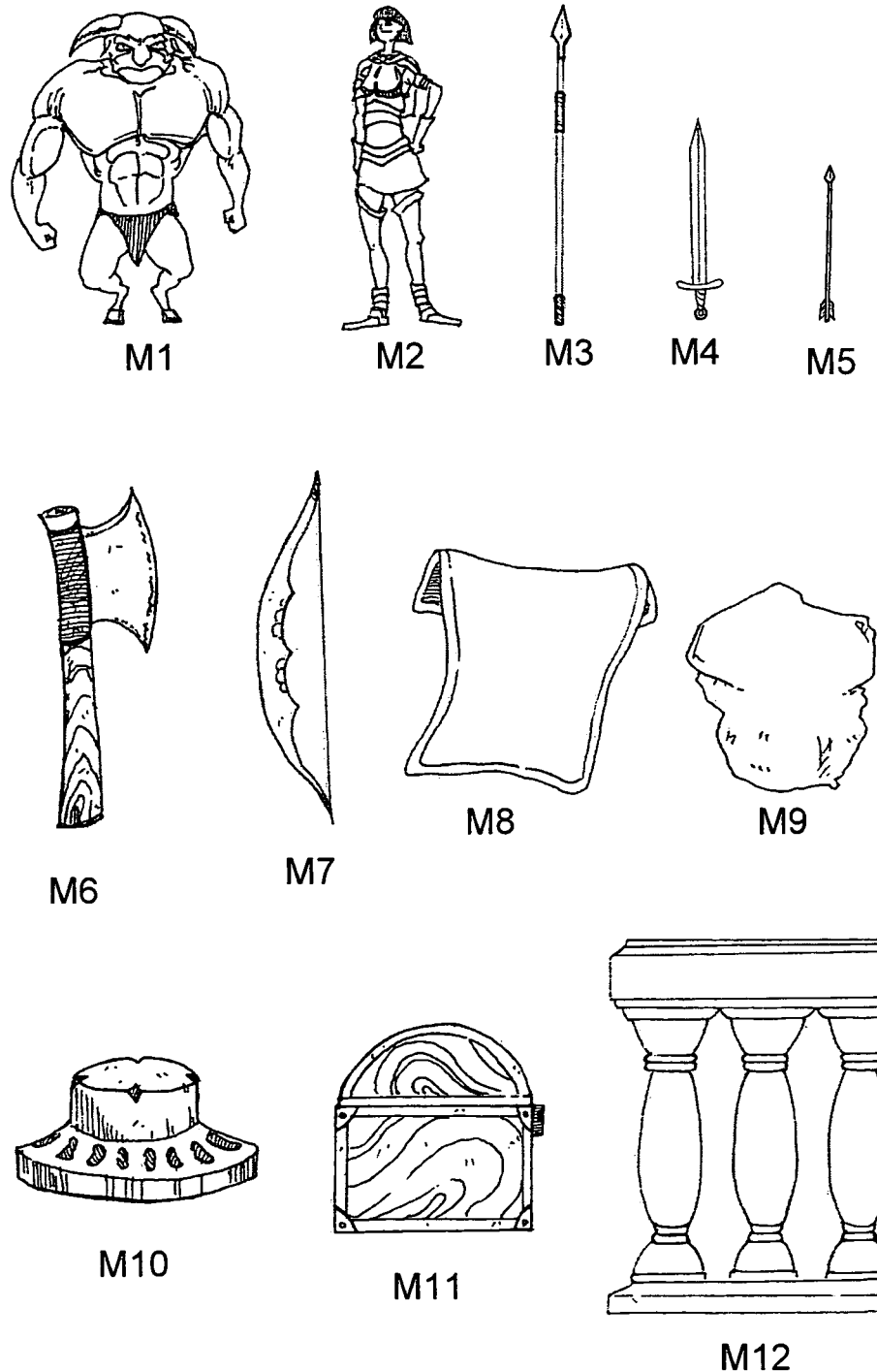
FIG. 7 shows exemplary in-game pre-production elements of a computer game.

FIG. 7 shows exemplary in-game pre-production elements M1-M12 of a computer game. For the purpose of illustration, only twelve elements M1-M12 are shown in FIG. 7. Also, for brevity, only scenes related to a battle between the monster M1 and the player character M2 will be described in the present document. In the game, the player character M2 may select one of the weapons M3-M7 in the battle with the monster M1 at a temple M12 and picks up a cloak of invisibility M8 in the box M11 located on the table M10. It is noted that both the non-game and in-game pre-production items may be generated prior to game plays and stored in the storage 104 (shown in FIG. 1).

FIG. 8 shows two exemplary game play data 802, 804 recorded during two different game plays of the computer game including the elements M1-M12 depicted in FIG. 7. As depicted, each game play data includes a log of events that can be used to create a scenario or story 401. Each row of the game play data shows the time when an action of the game player is taken, the reaction of the game in response to the action, and the location where the action is taken.

Figure 9:
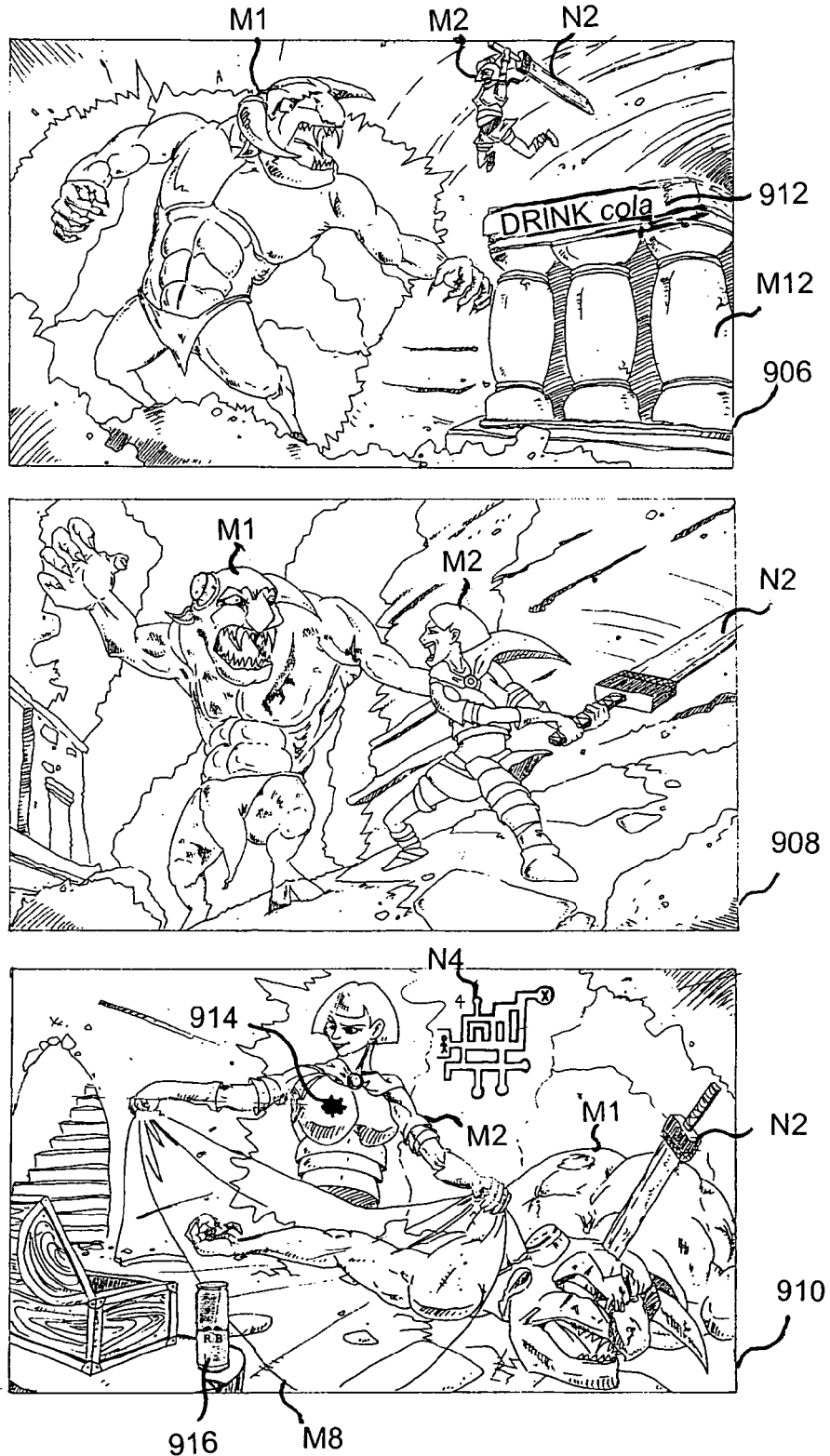
FIG. 9 shows three frames included in a personalized animation that might be generated by the personalized animation generation engine of FIG. 1.

Based on each game play data, say 802, the animation engine 102 determines scenes and generates a sequence of scenes to be included in a personalized computer animation. For instance, three scenes may be generated as illustrated in FIG. 9. FIG. 9 shows frames 906, 908, and 910 included in a personalized animation that might be generated by the personalized animation generation engine 102, where the three frames are selected from the three scenes of the personalized animation. In the first scene including the frame 906, the play character M2 hides on top of the temple M12 near the monster M1, then attacks the unsuspecting monster with a sword N2. Using the game play data in 802, necessary elements to form the first scene, such as models, layout of a location, camera placements at the location, camera movement at the location, motion of models during battle, shading parameters for appearance of models, light source parameters and placements at the location, visual effects, and sounds used in the battle, are selected from pre-production elements in 106.

As depicted in the game play data 802, the play character M2 uses the sword M4. If the analysis of the game play data shows the sword M4 is used frequently by the game player throughout the game play, the animation engine 102 may select a non-game pre-production element N2 in place of the sword M4 in the personalized animation thereby to reinforce the personal choice made by the game player. An advertisement content 912, which is another non-game pre-production item and selected from the advertisements 420, may be superimposed on the image of the temple M12.

In the second scene, the play character M2 fights against the monster M1 as depicted in the fame 908. All or part of the selected elements in the frame 908 may be transfigured for further personalization using the analysis of the game play data 802. For an example, if the analysis indicates frequent use of the sword M4 by a player, additional shadings may be applied to the sword N2 to show wear and tear thereof. The level of wear and tear to show is determined by the analysis, and a non-game shading element to alter visual appearance of the sword N2 is accordingly pulled from the shading 412 and applied.

In the third scene, the monster M1 is killed and the play character M2 picks up the cloak of invisibility M8. An exemplary non-game pre-production element N4 may be included in the frame 910. N4 is a computer model containing an image of a layout of the dungeon with a safe exit for the player character M2 marked with x. The layout N4 is not seen during game plays nor replays. With the layout, a viewer of the third scene can avoid dangers in future game plays if the viewer chooses to, thereby enhancing game play experiences. A non-game pre-production item, such as an advertisement 916 of a soft drink bottle, may be included in the frame 910. Also, another advertisement, such as a trademark 914, may be displayed on a costume of the play character M2.

Figure 10:
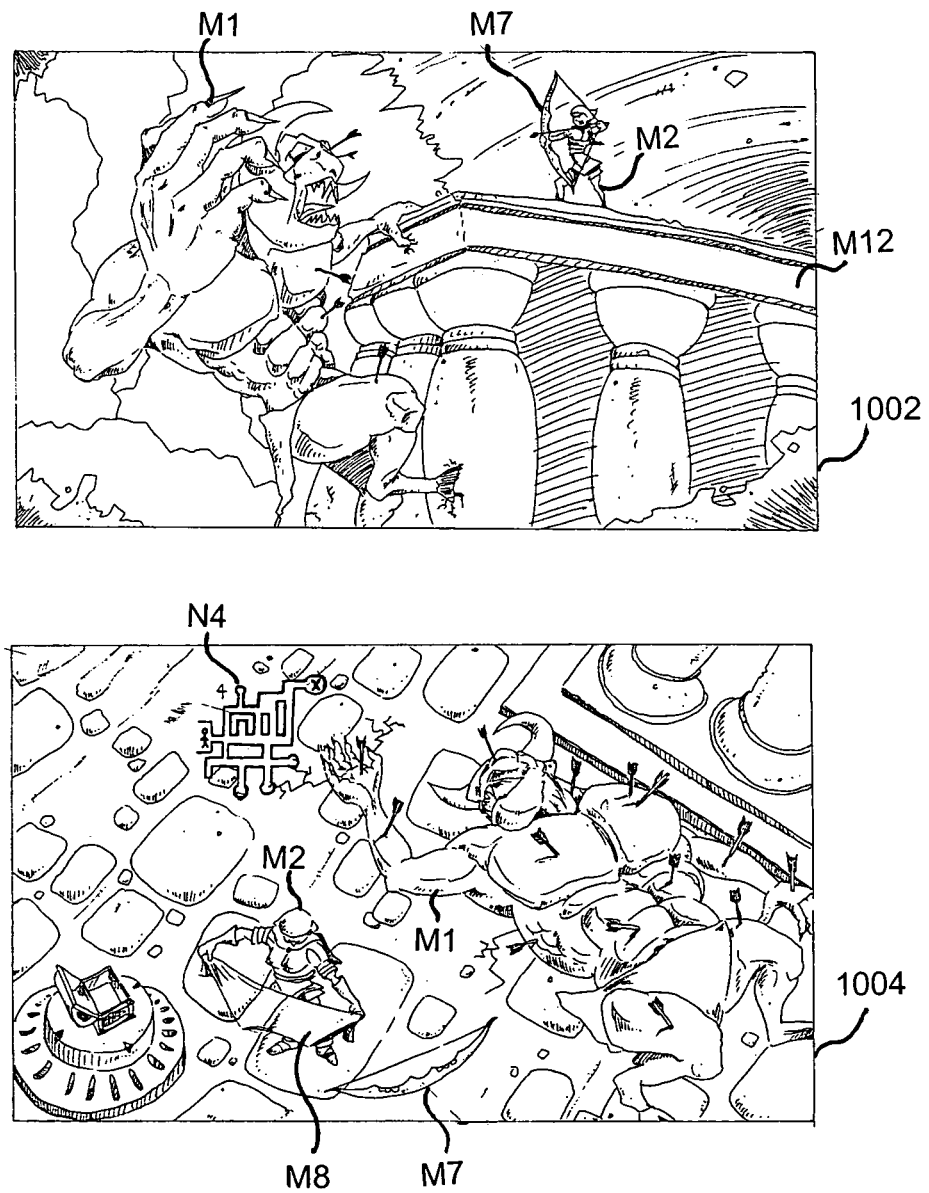
FIG. 10 shows two frames included in a personalized animation that might be generated by the personalized animation generation engine of FIG. 1.

Based on the game play data 804, the animation engine 102 may determine scenes and generate another sequence of scenes different those that based on the game play data 802. For instance, two scenes may be generated as illustrated in FIG. 10. FIG. 10 shows two frames 1002 and 1004 in a personalized animation that might be generated by the personalized animation generation engine 102, where the two frames are selected from the two scenes in the personalized animation. The game data in 804 shows that a player character M2 used the bow M7 and arrows M5 to kill the same monster M1.

In the first frame 1002, the same location as in the frame 906 may be used to show an initial attack of the play character M2. A camera may be moved in closer to the top of the temple M12 in the frame 1002 than in the frame 906, i.e., the frame 1002 is shown through a different camera from the one used in the frame 906, even though the same location as in the frame 906 is used in the frame 1002.

In the second frame 1004, the monster M1 falls to death. Then, the play character M2 picks up the cloak of invisibility M8. The analysis of the game play data 804 may yield statistical data that shows battle encounter counts with monsters and percentage of winning the battles. Using the analysis, additional shading selected from the shading 412 may be applied to the bow M7, which is an in-game pre-production element, to show different appearances of wear and tear, for instance.

Based on the analysis of game play data 804, such as the time spent to complete the battle between the monster M1 and the player character M2, a game play grade may be determined. In the case of a high grade, a non-game pre-production element, such as flames (not shown in FIG. 7) on arrows M5, may be pulled from the pre-production items 106 and applied in addition to or in replacement of the in-game special effect elements when the bow M7 is used. It is noted that other non-game pre-production elements, such as the layout of the dungeon N4, may be included in the frame.

It is noted that the frames 906, 908, 910, 1002, and 1004 in FIGS. 9 and 10 show few exemplary non-game pre-production items of a personalized computer animation. However, it should be apparent to those of ordinary skill that other suitable non-game pre-production items can be included in the frames without deviating from the scope of the present invention. For instance, various audio contents selected from the voices 414, sound tracks 416, and sound effects 418, may be included to enhance theatrical effects. For another instance, advertisements may be embedded as a part of an animation using virtual billboards in the animation. For yet another instance, advertisement contents may be added in a similar manner to television commercials, such as in front of, in the middle of, and/or at the end of the personalized animation. For a further instance, a hypertext link my be embedded in the frame so that a customer may visit a web site by clicking the hypertext link.

It is also noted that the non-game pre-production items included in the personalized computer animation are not seen to the game player during the game plays. However, if needed, personalized computer animations can only include in-game pre-production items. Also, the animation engine 102 may limit the level of audio and visual quality of the personalized animation to that of the game software, or generate personalized animations with enhanced audio and visual quality level to improve theatrical effects.

As depicted in FIGS. 9 and 10, two different scenarios are formed based on two different game play data. The animation engine 102 respectively generates two distinct personalized computer animations for the two scenarios, where each personalized computer animation is produced with the selected and transfigured pre-production elements through a rendering process. It is noted that different art designs 402 may be used to prepare non-game pre-production items to produce distinct personalized animations in art style based on the same game play data. The non-game pre-production items in the personalized computer animation provide viewers with further gratification beyond the scope of replay of saved game data in the prior arts.

As the preview material of a personalized computer animation, only the frames in FIG. 9 or FIG. 10 may be sent to the game player. As a variation, the preview material may include only a portion of each scenario, such as the third scene of FIG. 9 for instance. As another variation, the preview material may include the entire scenes for each game play data. The contents and length of the preview material may be determined by various factors, such as type of game, custom arts, and advertisements included therein. If the game player wants to buy the personalized computer animation, the animation engine generates entire scenes, merges them to generate a complete personalized computer animation, and send the completed animation to the game player.

It is noted that the game play data may be recorded during game plays of a board game. As an example, a group of people may play Dungeons and Dragons roleplaying board game. In such a case, a record keeper, who may be the dungeon master, may record the game play to generate game play data. In this case, the game play data may include a list of, inter alia, descriptions of situations which are set by the dungeon master, selections and results of dice rolls made by players in each situation, etc. The custom animation platform 101 may create a personalized computer animation using the game play data in a manner similar to that described in conjunction with FIGS. 4-10.

Figure 11:
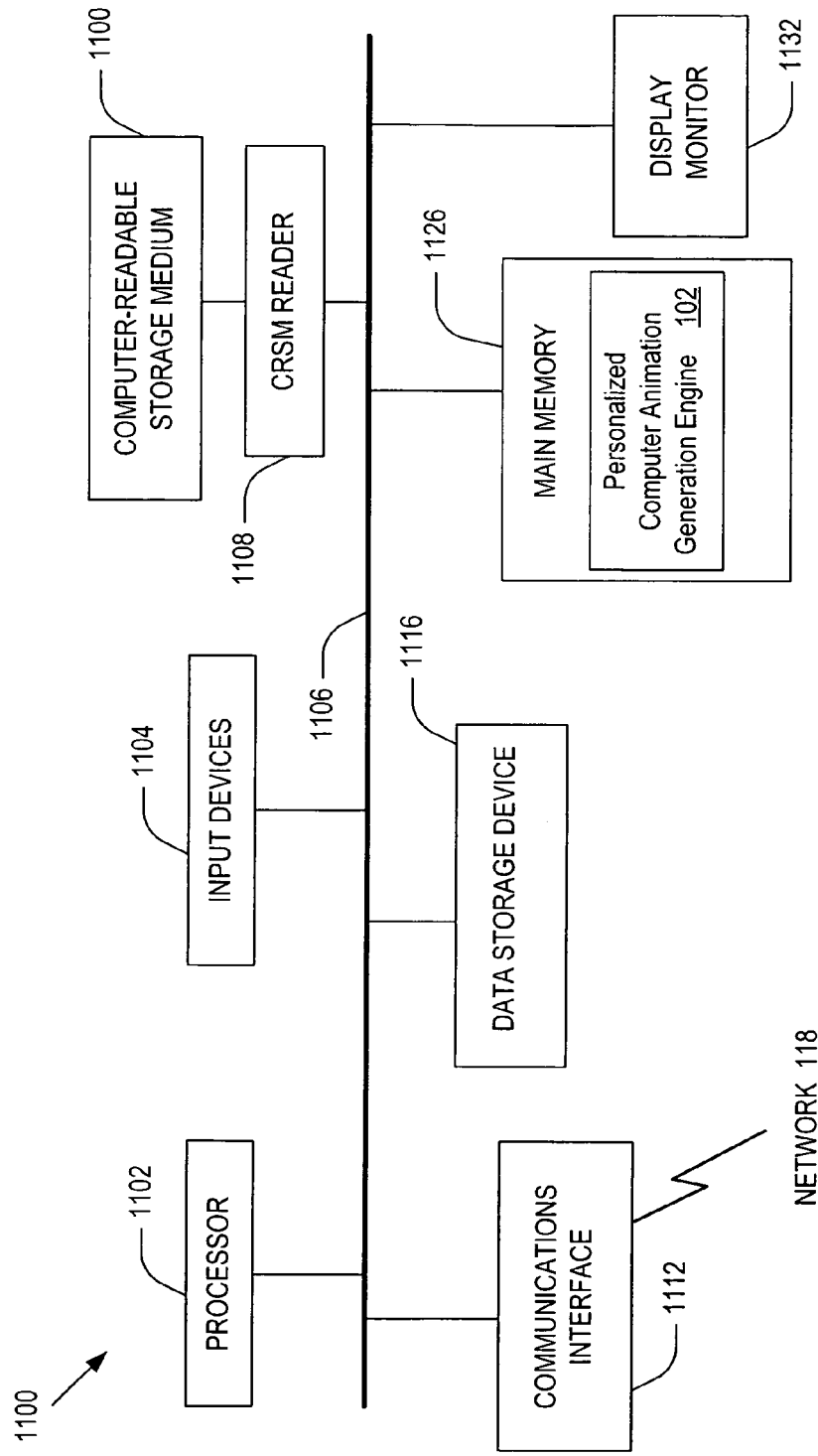
FIG. 11 shows an embodiment of a computer of a type that might be employed in accordance with an embodiment of the present invention.

FIG. 11 shows an embodiment of a computer 1100 of a type that might be employed as the custom animation platform 101 in accordance with the present invention. The computer 1100 may have less or more components to meet the needs of a particular application. As shown in FIG. 11, the computer may include one or more processors 1102 including CPUs. The computer may have one or more buses 1106 coupling its various components. The computer may also include one or more input devices 1104 (e.g., keyboard, mouse, joystick), a computer-readable storage medium (CRSM) 1100, a CRSM reader 1108 (e.g., floppy drive, CD-ROM drive), a communication interface 1112 (e.g., network adapter, modem) for coupling to the network 118, one or more data storage devices 1116 (e.g., hard disk drive, optical drive, FLASH memory), a main memory 1126 (e.g., RAM) containing. software embodiments, such as the animation engine 102, and one or more monitors 1132. Various software may be stored in the computer-readable storage medium 1100 for reading into a data storage device 1116 or main memory 1126.

While the invention has been described in detail with reference to specific embodiments thereof, it will be apparent to those skilled in the art that various changes and modifications can be made, and equivalents employed, without departing from the scope of the appended claims.

What is claimed is:

1. A method for generating a computer animation of a game, comprising:
   receiving game play data of the game;
   determining at least one scene based on the game play data;
   preparing at least one non-game pre-production element of the game that cannot be displayed to a player of the game during play of the game and corresponds to a counterpart in-game pre-production item displayed to the player during play of the game, wherein the game play data includes information of frequency of usage of the counterpart in-game pre-production item during play of the game;
   performing an statistical analysis of the information of frequency of usage;
   transfiguring the non-game pre-production element based on the statistical analysis
   setting up one or more frames in the scene, at least one of the frames including the transfigured non-game pre-production element of the game;
   rendering the frames; and
   combining the rendered frames to generate the computer animation.

2. A method as recited in claim 1, wherein the non-game pre-production element is generated by modifying an in-game pre-production element.

3. A method as recited in claim 1, further comprising:
   adding a sound to the computer animation.

4. A method as recited in claim 3, wherein the sound includes a non-game pre-production audio content that is different from a corresponding in-game pre-production audio content of the game in at least one of pitch, periodicity, duration, amplitude, and harmonic profile.

5. A method as recited in claim 3, wherein the sound includes a text-to-speech.

6. A method as recited in claim 1, wherein the non-game pre-production element includes an image that is different from a corresponding image of an in-game pre-production element of the game in at least one of form, shape, and color.

7. A method as recited in claim 1, wherein the frames include at least one selected from the group consisting of an advertisement content, custom art, a hint of a game, a secret of a game, and a preview of a game.

8. A method as recited in claim 7, wherein the advertisement content includes at least one selected from the group consisting of a product placement, a virtual billboard, a trademark placement, a hypertext link, and an animation.

9. A method as recited in claim 1, wherein the non-game pre-production element includes a three-dimensional image generated by modifying a two-dimensional image of an in-game pre-production element of the game.

10. A method as recited in claim 1, wherein the computer animation is rendered by use of a rendering algorithm different from a rendering algorithm used to generate the animation of the game.

11. A method as recited in claim 1, wherein the non-game pre-production element includes a three-dimensional image that has a higher polygon count than a corresponding three-dimensional image of an in-game pre-production element of the game.

12. A method as recited in claim 1, wherein the game is one selected from the group consisting of a computer game and a board game.

13. A method as recited in claim 1, further comprising:
   preparing game information of the game; and
   generating the non-game pre-production element.

14. A method as recited in claim 13, wherein the game information includes at least one scenario of the game and wherein the step of preparing game information includes:
   performing a reverse engineering to generate the scenario.

15. A method as recited in claim 1, further comprising:
   receiving gamer information of a gamer who plays the game.

16. A method as recited in claim 1, wherein the game play data includes a log of events.

17. A non-transitory computer readable medium carrying one or more sequences of pattern data for generating a computer animation of a game, wherein execution of one or more sequences of pattern data by one or more processors causes the one or more processors to perform the steps of:
   receiving game play data of the game;
   determining at least one scene based on the game play data;
   preparing at least one non-game pre-production element of the game that cannot be displayed to a player of the game during play of the game and corresponds to a counterpart in-game pre-production item displayed to the player during play of the game, wherein the game play data includes information of frequency of usage of the counterpart in-game pre-production item during play of the game;
   performing an statistical analysis of the information of frequency of usage;
   transfiguring the non-game pre-production element based on the statistical analysis;
   setting up one or more frames in the scene, at least one of the frames including the transfigured non-game pre-production element of the game;
   rendering the frames; and
   combining the rendered frames to generate the computer animation.

18. A non-transitory computer readable medium as recited in claim 17, wherein execution of one or more sequences of pattern data by one or more processors causes the one or more processors to perform the additional step of:
   adding a sound to the computer animation.

19. A non-transitory computer readable medium as recited in claim 17, wherein execution of one or more sequences of pattern data by one or more processors causes the one or more processors to perform the additional step of:
   storing the game play data and the non-game pre-production element in a storage device.

20. A non-transitory computer readable medium as recited in claim 17, wherein the game play data includes a log of events.

* * * * *